March 15, 1938.   E. ROUX   2,111,516
CINETHEODOLITE
Filed May 29, 1936   5 Sheets-Sheet 1

Inventor: Erwin Roux
by Karl Viertel
Attorney

Inventor: Erwin Roux
by Karl Viertel
Attorney

March 15, 1938. E. ROUX 2,111,516
CINETHEODOLITE
Filed May 29, 1936 5 Sheets-Sheet 3
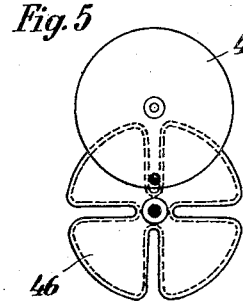
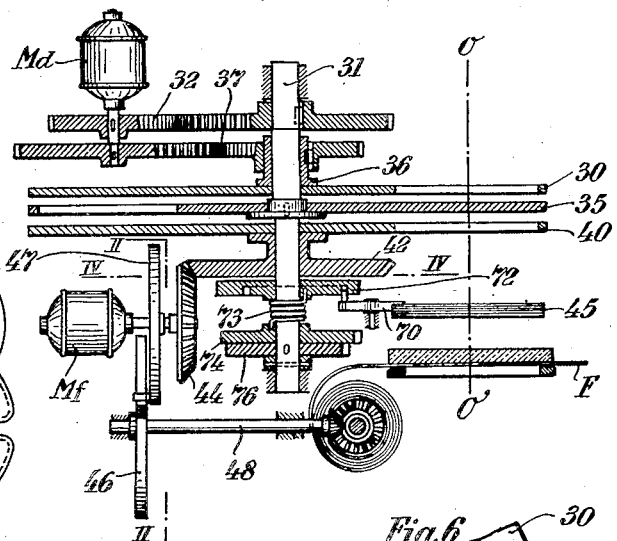
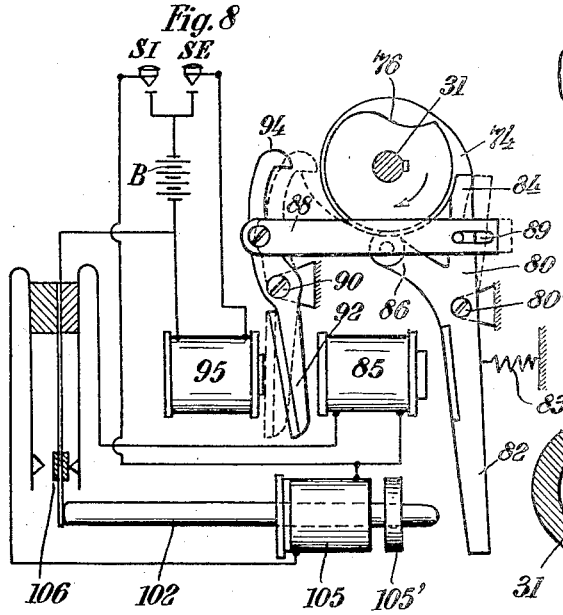
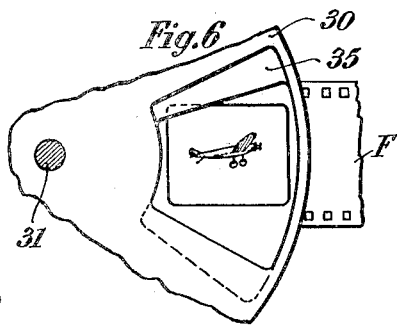
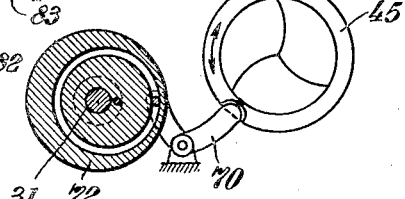
Inventor: Erwin Roux
by Karl Viertel
Attorney

Fig. 9

Patented Mar. 15, 1938

2,111,516

UNITED STATES PATENT OFFICE 2,111,516

CINETHEODOLITE

Erwin Roux, Berlin-Zehlendorf-Kl. Machnow, Germany

Application May 29, 1936, Serial No. 82,525
In Germany May 29, 1935

13 Claims. (Cl. 33—1)

My invention relates to the problem of determining by photogrammetric and graphic methods the airworthiness, speed, acceleration, sensitivity, rigidity, responsiveness to distant control and other aerodynamic and static properties of aircraft, such as aeroplanes, gliders, Zeppelin air ships, and kindred structures and of other objects rapidly moving in the air, including parachutes, air torpedoes and the like, collectively hereinafter called aircraft. With this object in view it has been proposed to take series of moving pictures of the aircraft to be tested synchronically from two fixed stations on the ground by means of cine-cameras, structurally combined with theodolites and known as cinetheodolites; on the sensitized films of which in addition to the motion pictures of the aircraft proper under test and aimed at by the camera men, sections of the vernier scales of the theodolites showing the respective sighting angles, altitude and azimuth,—designated $a$ and $h$, $a2$ and $h2$, $a3$ and $h3$, $a4$ and $h4$ (readings) on Fig. 1 of the accompanying drawings, are recorded on one and the same sections of the sensitized films as seen in Fig. 3.

Synchronism of exposures

A condition of paramount importance which is connected with the proper taking of photogrammetric records of the kind described, and on which the correctness and accuracy of the figures, factors and relations deduced largely depends, consists therein, that in both cinetheodolites, designated T and T2, which are cooperatively associated with a central controlling station indicated at S so as to present a unitary recording system, the exposures be made in strictest synchronism; otherwise the photograms, intended to be co-ordinated in pairs so as to be truly complementary to each other at the subsequent trigonometric analysis and other measuring operations, will not sharply correspond to each other and will not show the aircraft tested exactly in one and the same position.

Practical tests, to which cinetheodolite recording equipment, manufactured by the inventor's employers and described for instance in their British Patent 351,243 was subjected, have revealed, that the cinetheodolite cameras worked unsatisfactorily as to the exact synchronism of the exposures. It has been found that owing to the tremendous speed of modern army aeroplanes, exceeding 600 kilometers per hour, differences as small as one hundredth of a second in the times at which the exposures at the cooperating cinetheodolite cameras are made, will seriously impair the correctness of the data obtained from the respective coordinated photograms.

The principal object of this invention is to overcome the many difficulties offered by the problem under consideration and to provide an improved photogrammetric recording equipment of the type set forth which ensures strict synchronism of the exposures made in the cooperating cinetheodolite cameras.

Another object of the invention is to so redesign the cinetheodolite cameras of the equipment, to permit of a simultaneous change of the frequency of the exposures made, say from 5 to 10 or 20 exposures per second, so as to be in accord and to cope with variations of the speed of the aeroplane under test.

A noteworthy feature connected with the change of the exposure frequency, accomplished according to this invention, consists therein, that the said changes are executed almost instantaneously without any noticeable interruption of the recording operations.

Another object of the invention is to provide means for making single exposures synchronically in the cinetheodolite cameras of the equipment instead of taking series of photograms.

Further objects will be made evident hereinafter.

The nature and scope of the invention are briefly outlined in the appended claims and will be more fully understood from the following specification taken together with the accompanying drawings, in which:

Fig. 1 is a lay-out perspectively showing the whole scheme, namely the disposition of two cinetheodolite cameras at work and their cooperative association with the central controlling station. It should be noted that, since it is desirable to be independent of the position of the sun when making the records, the equipment should include three cinetheodolite cameras in all, which are to be located at the corners of a preferably rectangled triangle, of which the sides are from one to three kilometers in length.

Fig. 4 is a cross section showing the shutter and film feeding mechanism of the cinetheodolite cameras on a larger scale.

Fig. 5 is a side elevation showing details of the film feed gear.

Fig. 6 is a fragmentary side elevation showing the cooperation of the diaphragms of the primary shutter of the cinetheodolite cameras.

Fig. 7 is a side elevation of the auxiliary shutter and its operating elements, partly in section.

Fig. 8 is a lay-out showing an electromagnetic mechanism for controlling the operation of the auxiliary shutter.

Fig. 9 is another lay-out diagrammatically showing the different alternators and the switching mechanism for operation of the cinetheodolite cameras.

Figure 10:
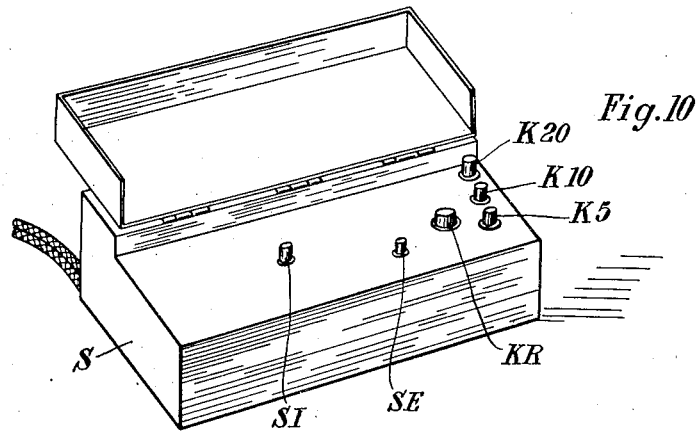

Fig. 10 perspectively shows the key board of the switching mechanism and a box wherein the latter is enclosed.

Figure 11:
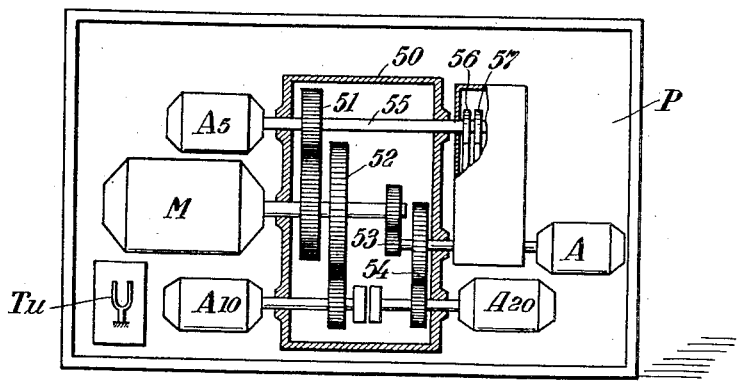

Fig. 11 is a lay-out showing diagrammatically the power plant re-designed for the purposes of this invention.

Figure 1:
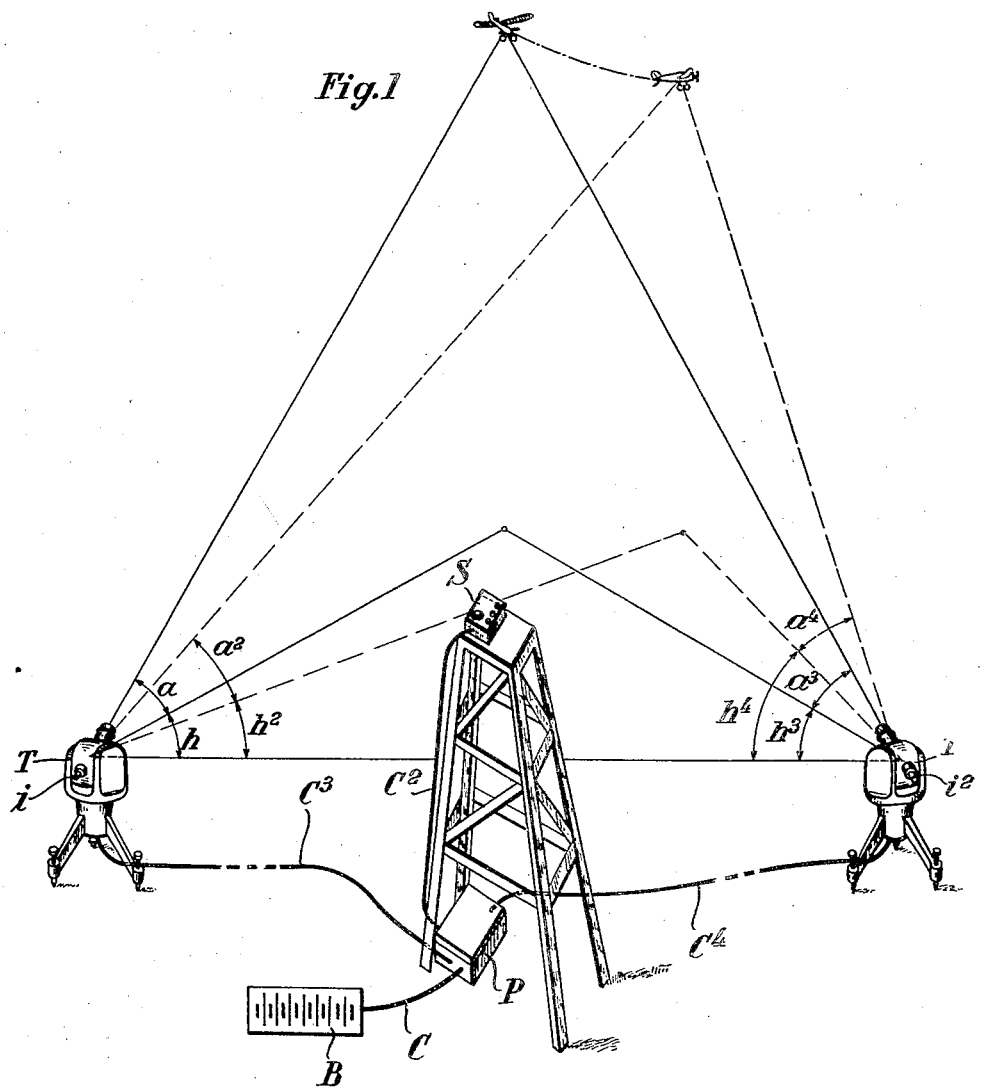

The photogrammetric recording equipment, improved according to this invention, essentially consists of cinetheodolite cameras T, T2 adapted to be swung around their vertical and horizontal axes by attendants, whose duty it is to observe the aeroplane under test in the air through telescopes, diagrammatically indicated in Fig. 1 at $i$ and $i^2$ and cooperatively associated with the cameras, so as to keep the optical main axis of the cameras directed to the aeroplane to be photographed.

A power plant P is provided for generating alternating currents of specific frequencies required for operating the cameras T, T2.

A switch box S in charge of another attendant is provided for controlling the supply of electrical energy to the cameras T—T2 in order to control the exposures to be made.

A system of multiple cables $c$, $c_2$, $c_3$ and $c_4$ interconnect the cameras, power plant, switch box, and a source of direct current, preferably a storage battery B.

Figure 2:
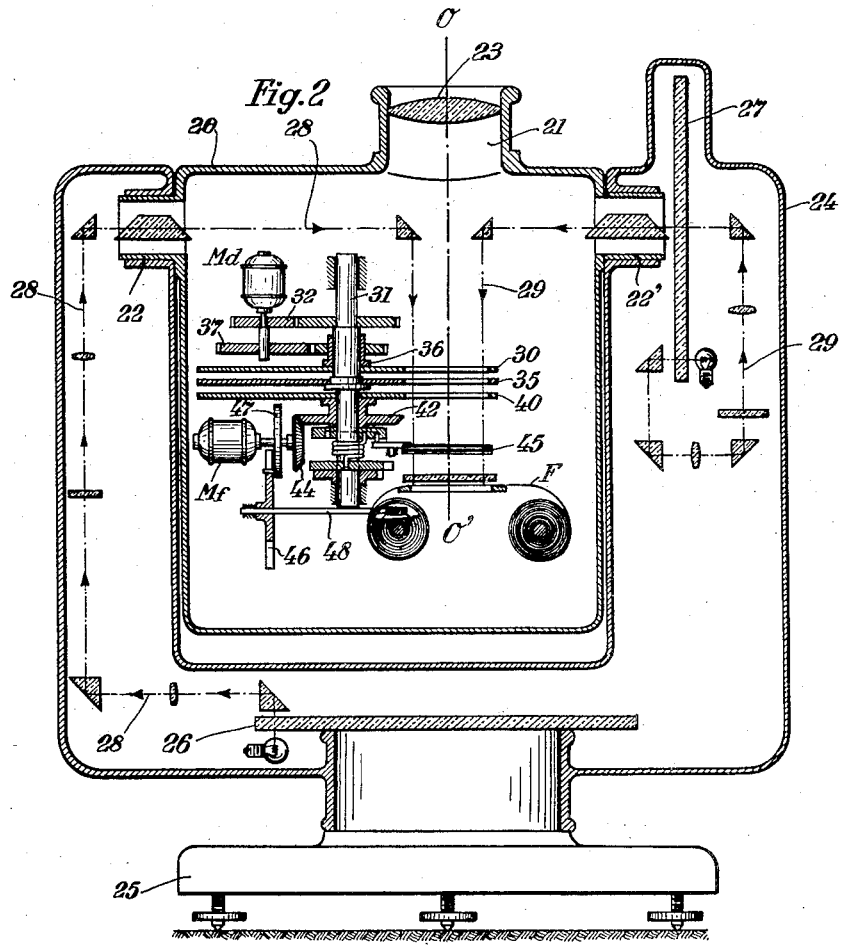
Fig. 2 is a cross section through one of the cinetheodolite cameras designed according to this invention which shows diagrammatically and by way of an example the arrangement and cooperative association of its principal parts.

Referring to Fig. 2 of the drawings, each of the cinetheodolite cameras of the equipment comprises a camera casing 20 having an exposure aperture 21 and being pivoted by means of hollow trunnions 22, 22' in the casing 24 of the theodolite proper. The latter is rotatably mounted on a stand 25 and encloses the vernier scales 26, 27 of transparent material. By means of optical systems diagrammatically indicated by arrows 28, 29, prisms, lenses, and electric lamps, the readings of the vernier scales are thrown through the trunnions 22, 22' into the camera casing 20 and are re-directed therein into the optical field of the exposure lens 23 indicated at o and o', so as to reach the sensitized film F.

No claim is made to the optical systems known in connection with cinetheodolite cameras.

Figure 3:
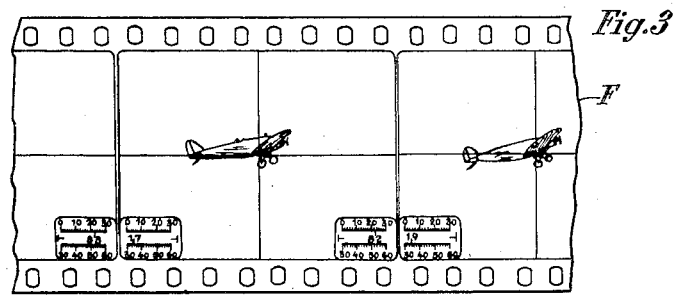
Fig. 3 shows on an enlarged scale a section of one of the films, which was exposed in one of the cinetheodolite cameras, designed according to this invention and is ready for use in the subsequent measuring operations.

Trigonometric, graphic, arithmetic and other computing methods, not described hereinafter, are known in aeronautics and kindred arts, by which from two series of photographic records, of the type seen in Fig. 3, namely from the differences in the readings on the vernier scales— altitude and azimuth angles—synchronically photographed on the films concerned in two cinetheodolite cameras, widely spaced from each other, the speed, acceleration, sensitivity, rigidity, responsiveness to distant control and other aerodynamic and static properties of aircraft can be determined.

With the objects outlined above the shutter mechanism, the film feeding mechanism of the cinetheodolite cameras and their actuating means have been re-designed, as described hereinafter:

The shutter mechanism essentially consists of a primary shutter for timing the exposures to be made, comprising two rotary diaphragms 30, 35 coaxially keyed to a shaft 31 and a sleeve 36 respectively and being rotated by gears 32 and 37 at different rates of speed; the respective rates of speed are so proportioned as to represent whole, integer, numbers, for instance 1:3, 1:4; and a secondary shutter cooperatively associated with the former for making the actual exposures.

The secondary shutter comprises a rotary diaphragm 40 attached to a bevel gear 42, meshing with a second gear 44, an auxiliary shutter of any convenient design preferably of the iris diaphragm type, widely known in the optical art and diagrammatically indicated at 45, and distant control means for opening and closing said auxiliary shutter 45 in both cameras at the operator's discretion, which are described in detail hereinafter.

According to this invention, viz. in order to ensure strict synchronism of the exposures, made in speedy succession by the said diaphragms, two electric synchronous motors Md and Mf are provided in each camera, to which alternating current is supplied from the power plant P, and of which the primary motor Md operates the primary shutter, while the secondary motor Mf operates separately diaphragm 40 of the secondary shutter and the film feeding mechanism. The latter is diagrammatically indicated by a slot wheel and pin gear 46, 47 operating shaft 48 and accessorial elements coupled therewith known in the art and not shown.

The inventor's experiments have shown, that exact synchronism of the exposures is not achieved, if only one single electric motor is provided in each camera for jointly operating both the shutter and the film feeding mechanism. The lack of synchronism experienced in this case is due to the intermittent, non-uniform character of the film feed and probably also to accidental changes in the frictional resistance offered by the film feeding elements in each camera, which unfavorably react upon its driving motor and in turn upon the shutter mechanism.

*Change of frequency of the exposures*

It has further been found, that, when using only one electric motor in each of the cinetheodolite cameras of the recording system it is practically impossible to change at will the frequency of the exposures without destroying the synchronism of the shutter operation or interrupting the exposures altogether; moreover, speeding up or retarding the film feed in both cameras in service, so as to take a larger or smaller number of pictures per second would require rather complicated speed change gears and electrical controlling devices difficult to supervise and operate.

With the object of enabling the superintending operator of the cinetheodolite measuring station to temporarily change the number of exposures made per second, in compliance with changes of speed of the aeroplane under observation, as for instance in stunt flying, zooming, diving, looping, sliding, spinning, the following apparatus and fixtures for producing and timely distributing electric energy are assembled in the power plant P and in the switch box S of the equipment, and are connected by cables C and C4 with a source of direct current B and the motors Md and Mf of the cinetheodolite cameras T, T2:

(1) A set of three alternators A5, A10, A20 for selectively supplying alternating current of different frequency, for instance, 5, 10, 20 cycles, respectively, to the film feed motors Mf, Mf2 of the cameras, (2) An electric motor M, by which said alternators are permanently and jointly driven during the recording operations through power transmitting gears 51, 52, 53, 54 of different ratio enclosed in a gear box 50; the respective ratios of gearing representing whole, unbroken, numbers and being proportionate to the respective frequencies of the alternators, (3) Another alternator A for feeding the primary or shutter motors Md of the cameras, which may be driven to advantage by the same motor M and gearings seen in Fig. 11, operating the said set of alternators, and (4) Switching means operable by the operator and described hereinafter in detail for selectively connecting any of the alternators A5, A10, A20 with the secondary or film feed motors Mf, Mf2.

*Phase control*

Phase controlling means, operating on direct current are provided according to this invention which automatically come into action, when the film feed motors Mf are switched to operate on a different frequency. The phase controlling means simultaneously restore the armatures of the film feed motors Mf of the cameras T, T2 to their respective zero-positions so as to ensure coincidence of phase in both motors and, in turn, true synchronism of the film feed.

Figure 9:
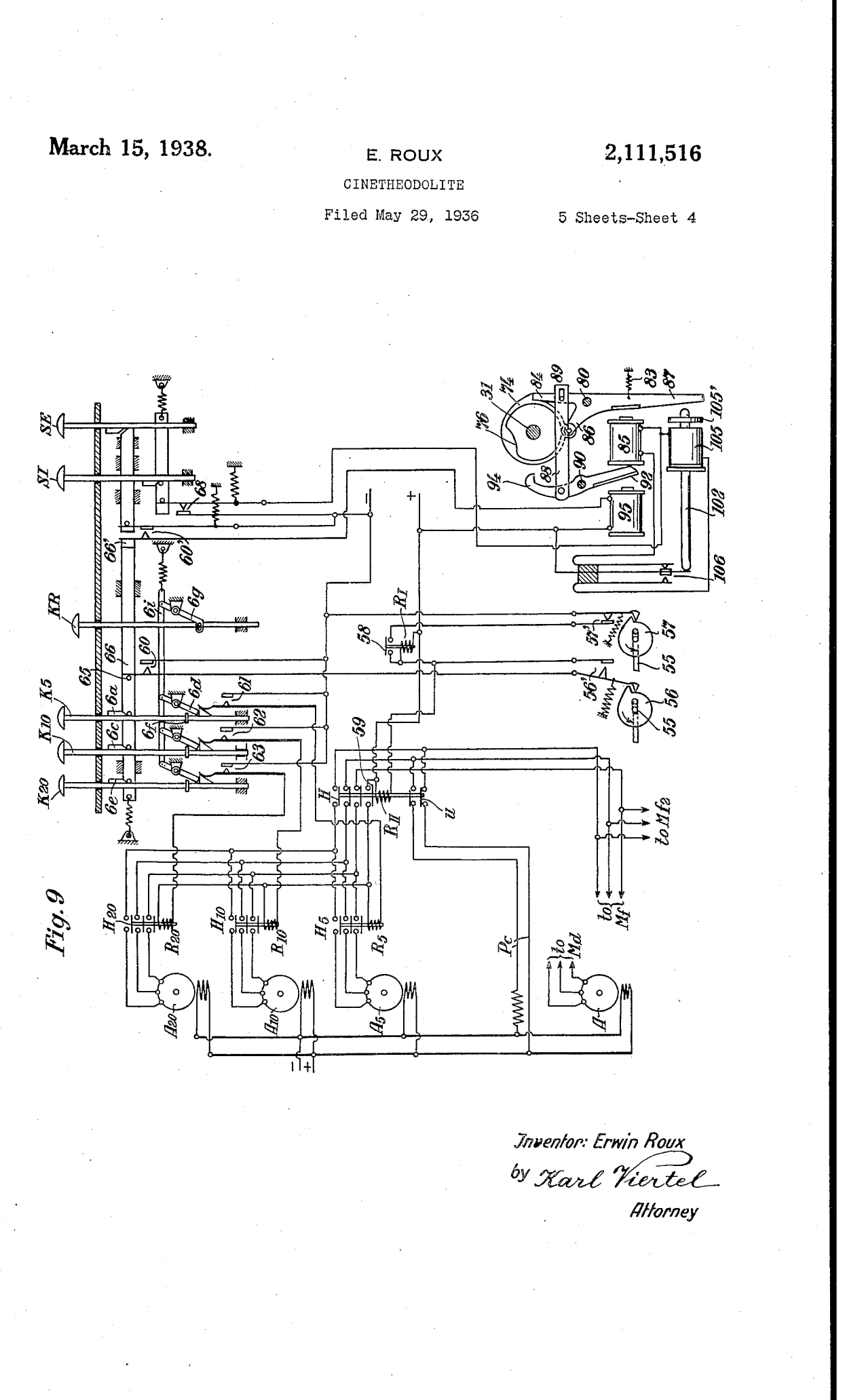

Said phase controlling means are cooperatively associated with the frequency selection switches concerned under the operator's control and are adapted to automatically shunt back the armatures of the film feed motors Mf during a short interval to a direct current circuit called phase control circuit and indicated at Pc in Fig. 9.

Said phase controlling means include a pair of rotary cams 56, 57 keyed to the shaft 55 of alternator A5 (Figs. 9 and 11), which runs at the lowest speed of the set. The projecting crest portions of said cams are both so directed, as to coincide or register with the zero-position of the armature of alternator A5, and are cooperatively associated with a pair of impulse sending switches 56' and 57'. The switches are connected through a system of wires with a primary relay RI operating a primary contact member 58; a secondary relay RII, connected in series with the primary relay RI and operating a secondary contact member 59, a shunting switch U, and a frequency master switch H; a direct current main switch 60, actuated at 65, by a spring loaded slide bar 66; and frequency selecting switches 61, 62, 63 operable by master keys K5, K10, K20, which engage said slide bar 66 through incline cam and pin gears 6a, 6c, 6e. The master keys are provided with collars 6f cooperating with catches 6d hinged to a spring loaded bar 6i in such manner, that on depressing any one of the master keys so as to close the circuit at 61 or 62 or 63, it is retained by its catch 6d in operative position, until being released by a release key KR, which through lever 6g throws the catches 6d out of engagement. Frequency selector relays R5, R10, R20 operate line relays H5, H10, H20.

The above described alternators, switches and relays are interconnected with the said source of direct current, indicated in Fig. 9 by its positive and negative terminals, and the motors Md and Mf by a system of wires and multiple cables C—C4 so as to cooperate in the following manner:

As long as none of the master keys K5, K10, K20 is depressed none of the frequency selector relays R5, R10, R20 is excited, neither is the secondary relay RII excited, the film feed motors Mf of the cameras T, T2 being then connected with the phase control direct current circuit Pc, with the result, that their armatures are electrically blocked in their zero position.

In the meantime the motors Md operating the primary shutters 30, 35 of the cameras T, T2 are running, being fed by the alternator A, but no exposures are made because the path of the light rays passing therethrough is blocked by the secondary diaphragm shutter 40 and the auxiliary shutter 45.

On depressing master key K5 and thereby closing switches 60 and 61 both the frequency selector relay R5 and the primary relay RI are ready to be excited; the relay circuit RI however is not closed until contact is made at 56' by the rotary cam 56, that is, not until alternator A5 is in its zero-position.

After contact is made at 56' both the primary and secondary relays RI and RII which are connected in series are excited with the result, that the circuit of the frequency selector relay R5 is closed at 59 and line relay H5, actuated thereby, is thrown into its operative position.

On depressing the master key K5 and thus causing the film feed motors Mf of the equipment to run on alternating current of 5 cycles frequency and with coincidence of phase the films are fed at the rate of 5 feedings per second and also the diaphragm 40 of the cameras T, T2 is rotated. The cameras T, T2 are now ready for making exposures as soon as the auxiliary shutter 45, described in detail hereinafter, is opened for longer or shorter periods.

On depressing the release key KR the master key K5 and its switch 61 are thrown out of operation. Independently thereof the primary and secondary relays RI and RII are not disconnected until their circuit is interrupted at 57', at the moment, when shaft 55 of alternator A5 passes through its zero position.

By depressing another of the master keys K10 or K20 the same cycle of operations described above with reference to key K5 is repeated analogously.

The auxiliary shutter 45, which is preferably of the iris diaphragm type, is operated by an electromagnetically controlled mechanism, which in the embodiment of the invention shown in the drawings by way of an example includes a bell crank lever 70 (Figs. 4 and 7) associated by a pin projecting therefrom with an excentric notched disk 72. The disk is journalled on the shaft 31, driven by the shutter motor Md, and is connected to the pin shaped projecting end of a spring band coupling 73, which frictionally engages shaft 31, so as to rotate therewith.

A pair of cams 74 and 76 is mounted on the shaft 31, the cam 74 being connected to spring-band coupling 73 engaging the shaft 31 and the excentric 72, while cam 76 is keyed to shaft 31.

A three-armed lever is fulcrumed at 80, the staggered upper ends or pawls 84, 86 of which are adapted to cooperate with the cams 74, 76 respectively in such manner, that pawl 84 can be thrown out of engagement with cam 74 only when pawl 86 enters into the recessed portion of cam 76. The lower end 82 of the three armed lever is loaded by a spring 83 and forms the armature of an electromagnet 85.

A hooked catch member 94 is fulcrumed at 90, which is adapted to arrest cam 74 on having made a half turn as indicated in Fig. 8 in dotted lines, and to which a push bar 88 slotted at 89 is hinged engaging pawl 84. The lower end 92 of catch 94 is associated with an electromagnet 95.

A further electromagnet 105 is provided having an armature 105' with a bolt 102 attached thereto, the latter being slidably fitted within the electromagnet 105 and adapted to cooperate with the resilient contact member of a two-way switch 106 and further with the lower section 82 of lever 80.

Exposure keys SE and SI operate switches 60' and 68, which are connected with the electromagnets 85, 95, 105, the two-way switch 106 and the source of direct current B through a system of wires.

The operation of the electromagnetic device for actuating the auxiliary shutter 45 is as follows:

On depressing exposure key SE and closing the direct current circuit at 60' the electromagnet 95 is excited, catch member 94 is thereby swung into its operative position, shown in dotted lines in Fig. 8, while pawl 84 is thrown out of engagement with cam 74, by push bar 88. Thus cam 74 on having made only a half turn is arrested and incidentally the excentric 72 and the lever 70 are stopped; the auxiliary iris shutter 45, which was opened during said half turn of cam 74 will thereby be kept in opened condition and series of pictures are then taken in speedy succession consistent with the respective speed of the film feed motors Mf running on alternating current of 5, 10 or 20 cycles.

On depressing exposure key SI and closing the direct current circuit at 68 electromagnet 85 is excited and pawl 84 is thrown out of engagement with cam 74. By the succeeding cooperation of lever 82, bolt 102, electromagnet 105 and the two-way switch 106, electromagnet 85 is disconnected and the three armed lever 80 is returned by spring 83 into its operative position, in which cam 74 is arrested having made a full 360° turn. In this manner single exposures can be made in suitable intervals at the operator's option.

Various changes and modifications may be conveniently made in the structural details of the mechanism and expedients assembled for cooperation in the improved theodolite recording equipment described, without substantially departing from the spirit and the salient ideas of this invention.

For instance the motor M driving jointly the alternators A, A5, A10 and A20 may be cooperatively associated to advantage with one of those automatic, highly sensitive speed controlling attachments known in the electrical field as tuning fork regulators, symbolically indicated at T$u$ in Fig. 11.

Slide bar 66 may be elongated to advantage and provided with an extension indicated at 66', so as to engage and operate switch 60', independently of exposure key SE. In this case series of pictures are taken whenever one of the switches 61, 62, 63 operated by the master keys K5, K10, K20, is in action and the film feed motors Mf of the cameras are connected with one of the alternators A5, A10, A20.

What I claim is:

1. In a photogrammetric recording system a plurality of recording moving picture cameras, each camera including a film feeding mechanism and a film exposing mechanism, a synchronous motor for said feeding mechanism, and a synchronous motor for said exposing mechanism; means connected to supply alternating current of a predetermined frequency to all feeding motors of said cameras; and means connected to supply alternating current of an integer multiple of said predetermined frequency to all exposing motors of said cameras.

2. In a photogrammetric recording system a plurality of recording moving picture cameras, each camera including a film feeding mechanism and a film exposing mechanism, a synchronous motor for said feeding mechanism, and a synchronous motor for said exposing mechanism; a first generator connected to supply alternating current to all feeding motors of said cameras; a second generator connected to supply alternating current to all exposing motors; a common prime mover; and motion transmission means between said generators and said prime mover, the ratio of transmission being such as to move said second generator to produce an alternating current of a frequency which is an integer multiple of the frequency of said first generator.

3. In a photogrammetric recording system a plurality of recording moving picture cameras, each camera including a film feeding mechanism and a film exposing mechanism, a synchronous motor for said feeding mechanism, and a synchronous motor for said exposing mechanism; a first source connected to supply alternating current of a predetermined frequency to all exposing motors of said cameras; a plurality of second sources of alternating current of integer multiples of the predetermined frequency of said first source; and means for interchangeably connecting the feeding motors of all of said cameras to one of said second sources.

4. In a photogrammetric recording system a plurality of recording moving picture cameras, each camera including a film feeding mechanism and a film exposing mechanism, a synchronous motor for said feeding mechanism, and a synchronous motor for said exposing mechanism; a first generator connected to supply alternating current to all exposing motors of said cameras; a plurality of second generators; a common prime mover; motion transmission means between said prime mover and said first and second generators the ratio of transmission being such as to move said second generators to produce alternating currents of a frequency which is an integer multiple of the frequency of said first generator; and means for interchangeably connecting the feeding motors of all of said cameras to one of said second generators.

5. In a photogrammetric recording system a plurality of recording moving picture cameras, each camera including a film feeding mechanism and a film exposing mechanism; a synchronous motor for said feeding mechanism, and a synchronous motor for said exposing mechanism; a first source connected to supply alternating current of a predetermined frequency to all exposing motors; a second source of alternating current; a source of direct current; and means for alternatively connecting said feeding motors to said source of direct current, whereby all motors are moved into phase, and to said second source of alternating current, whereby said motors are moved synchronously, maintaining their correct phase relation.

6. In a photogrammetric recording system a plurality of recording moving picture cameras, each camera including a film feeding mechanism and a film exposing mechanism; a synchronous motor for said feeding mechanism, and a synchronous motor for said exposing mechanism; a first source connected to supply alternating current of a predetermined frequency to all exposing motors; a plurality of second sources of alternating current of integer multiples of said predetermined frequency; a source of direct current; and means for alternatively connecting said feeding motors to said source of direct current, for phase adjustment, and to one of said second sources of alternating current, for synchronous operation.

7. In a photogrammetric recording system a plurality of recording moving picture cameras, each camera including a film feeding mechanism and a film exposing mechanism; a synchronous motor for said feeding mechanism, and a synchronous motor for said exposing mechanism; a first source connected to supply alternating current of a predetermined frequency to all exposing motors; a plurality of second sources of alternating current of integer multiples of said predetermined frequency; a source of direct current; a selector switch for each of said second sources of current; a common contact operable by each of said selector switches; a secondary relay arranged alternatively to connect said feeding motors to said source of direct current and to said second sources of alternating current, respectively; a line relay associated to each of said second sources and arranged to connect and disconnect the respective source to said secondary relay, each line relay being jointly controlled by the respective of said selector switches and said secondary relay; a make contact connected to be periodically operated in response to the frequency of one of said secondary sources; and a primary relay connected to control said secondary relay, said primary relay being jointly controlled by said common contact and said make contact.

8. In a photogrammetric recording system a plurality of recording moving picture cameras, each camera including a film feeding, mechanism and a film exposing mechanism; a synchronous motor for said feeding mechanism, and a synchronous motor for said exposing mechanism; a first source connected to supply alternating current of a predetermined frequency to all exposing motors; a plurality of second sources of alternating current of integer multiples of said predetermined frequency; a source of direct current; a selector switch for each of said second sources of current; a common contact operable by each of said selector switches; a secondary relay arranged alternatively to connect said feeding motors to said source of direct current and to said second sources of alternating current, respectively; a line relay associated to each of said second sources and arranged to connect and disconnect the respective source to said secondary relay, each line relay being jointly controlled by the respective of said selector switches and said secondary relay; a make contact connected to be periodically operated in response to the frequency of one of said secondary sources; a primary relay having make contacts and being connected to control said secondary relay, said primary relay being jointly controlled by said common contact and said make contact; and a break contact connected to be periodically operated in response to the frequency of one of said secondary sources, said break contact being connected to supply said primary relay with energizing current over one of its said make contacts.

9. A photogrammetric moving picture camera comprising, in combination, a support, a camera casing having an exposure aperture and mounted on said support for movement about two axes perpendicular to each other; means for moving sensitized film past said exposure aperture, said means including a first synchronous motor; a revolving first shutter member having an aperture and arranged to intercept and open the path of light from said exposure aperture to said firm; a second synchronous motor connected to actuate said first shutter member; a second revolving shutter member having an aperture and arranged to intercept and open the path of light from said exposure aperture to said film, said second member being connected to be actuated by said second motor at a rate which is an integer multiple of the rate of said first member; a third revolving shutter member having an aperture and arranged to intercept and open the path of light from said exposure aperture to said film, said third member being connected to be actuated by said first motor; and optical means for projecting into the path of light an image indicating the position of the camera relatively to said support.

10. In a photogrammetric moving picture camera the combination with a camera casing having an exposure aperture and means for moving sensitized film past said aperture said means including a first synchronous motor; of a revolving first shutter member having an aperture and arranged to intercept and open the path of light from said exposure aperture to said film; a second synchronous motor connected to actuate said first shutter member; a second revolving shutter member having an aperture and arranged to intercept and open the path of light from said exposure aperture to said film, said second member being connected to be actuated by said second motor at a rate which is an integer multiple of the rate of said first member; a third revolving shutter member having an aperture and arranged to intercept and open the path of light from said exposure aperture to said film, said third member being connected to be actuated by said first motor; whereby a path of light is prepared by said first and second member during a predeterminable period of exposure while the number of exposures per time unit is controllable by the rate of said first motor.

11. In a photogrammetric moving picture camera the combination with a camera casing having an exposure aperture and means for moving sensitized film past said aperture said means including a first synchronous motor; of revolving first shutter disk having an aperture and arranged to intercept and open the path of light from said exposure aperture to said film; a second synchronous motor connected to actuate said first shutter disk; a second revolving shutter disk having an aperture and arranged to intercept and open the path of light from said exposure aperture to said film, said second disk being connected to be actuated by said second motor at a rate which is an integer multiple of the rate of said first member; a third revolving shutter disk having an aperture and arranged to intercept and open the path of light from said exposure aperture to said film, said third disk being connected to be actuated by said first motor; whereby a path of light is prepared by said first and second disk during a predeterminable period of exposure while the number of exposures per time unit is controllable by the rate of said first motor.

12. In a photogrammetric moving picture camera the combination with a camera casing having an exposure aperture and means for moving sensitized film past said aperture said means including a first synchronous motor; of revolving first shutter disk having an aperture and arranged to intercept and open the path of light from said exposure aperture to said film; a second synchronous motor connected to actuate said first shutter disk; a second revolving shutter disk having an aperture and arranged to intercept and open the path of light from said exposure aperture to said film, said second disk being coaxially arranged with said first disk and connected to be actuated by said second motor at a rate which is an integer multiple of the rate of said first member; a third revolving shutter disk having an aperture and arranged to intercept and open the path of light from said exposure aperture to said film, said third disk being coaxially arranged with said first disk and connected to be actuated by said first motor; whereby a path of light is prepared by said first and second disk during a predeterminable period of exposure while the number of exposures per time unit is controllable by the rate of said first motor.

13. In a photogrammetric moving picture camera the combination with a camera casing having an exposure aperture and means for moving sensitized film past said aperture said means including a first synchronous motor; a revolving first shutter member having an aperture and arranged to intercept and open the path of light from said exposure aperture to said film; a second synchronous motor connected to actuate said first shutter member; a second revolving shutter member having an aperture and arranged to intercept and open the path of light from said exposure aperture to said film, said second member being connected to be actuated by said second motor at a rate which is an integer multiple of the rate of said first member; a third revolving shutter member having an aperture and arranged to intercept and open the path of light from said exposure aperture to said film, said third member being connected to be actuated by said first motor; a further shutter arranged to intercept and open the said path of light from said exposure aperture to said film, said further shutter being connected to be operated by said first synchronous motor.

ERWIN ROUX.